US012598260B2

(12) United States Patent
Deng et al.

(10) Patent No.:  US 12,598,260 B2
(45) Date of Patent:       Apr. 7, 2026

(54) HYBRID DIGITAL SIGNAL PROCESSING-ARTIFICIAL INTELLIGENCE ACOUSTIC ECHO CANCELLATION FOR VIRTUAL CONFERENCES

(71) Applicant: Zoom Video Communications, Inc., San Jose, CA (US)

(72) Inventors: Jiachuan Deng, Singapore (SG); Cheng Lun Hu, Singapore (SG); Zhaofeng Jia, Saratoga, CA (US); Qiyong Liu, Singapore (SG); Wei Wang, Hefei (CN); Yueguan Wang, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 372 days.

(21) Appl. No.: 18/099,577

(22) Filed: Jan. 20, 2023

(65) Prior Publication Data

US 2024/0251039 A1      Jul. 25, 2024

(51) Int. Cl.
*H04M 9/08*          (2006.01)
*G10K 11/178*      (2006.01)

(52) U.S. Cl.
CPC ....... *H04M 9/082* (2013.01); *G10K 11/17823* (2018.01); *G10K 11/17854* (2018.01)

(58) Field of Classification Search
CPC .................. H04M 9/082; H04M 3/002; G10K 11/17854; G10K 11/17823; G10L 15/16
USPC .................................................... 379/406.08
See application file for complete search history.

(56) References Cited

U.S. PATENT DOCUMENTS

| | | | | |
|---|---|---|---|---|
| 10,348,887 | B2 * | 7/2019 | Shi | H04M 3/002 |
| 2019/0222691 | A1 | 7/2019 | Shah et al. | |
| 2023/0197065 | A1 * | 6/2023 | Mun | G10L 15/16 |
| | | | | 704/200 |

FOREIGN PATENT DOCUMENTS

| | | |
|---|---|---|
| EP | 1044558 B1 | 11/2003 |
| WO | 02/03563 A1 | 1/2002 |

OTHER PUBLICATIONS

PCT International Search Report and Written Opinion for PCT/US2024/010648 mailed Apr. 25, 2024.

* cited by examiner

*Primary Examiner* — Md S Elahee
(74) *Attorney, Agent, or Firm* — Kilpatrick Townsend & Stockton LLP

(57) ABSTRACT

Example methods and systems provide hybrid DSP-AI acoustic echo cancellation for virtual conferences. A digital signal processing (DSP)-based linear acoustic echo cancelation (AEC) can be performed on an input audio signal to filter out linear echo present in the input audio signal and generate a first filtered audio signal. A level of nonlinear echo present in the first filtered audio signal can then be determined. When the level of nonlinear echo satisfies a threshold, an artificial intelligence (AI)-based nonlinear AEC can be performed on the first filtered audio signal to generate an AI-filtered audio signal. When the level of nonlinear echo does not satisfy the threshold, a DSP-based nonlinear AEC can be performed on the first filtered audio signal to generate a second filtered audio signal.

20 Claims, 9 Drawing Sheets

300

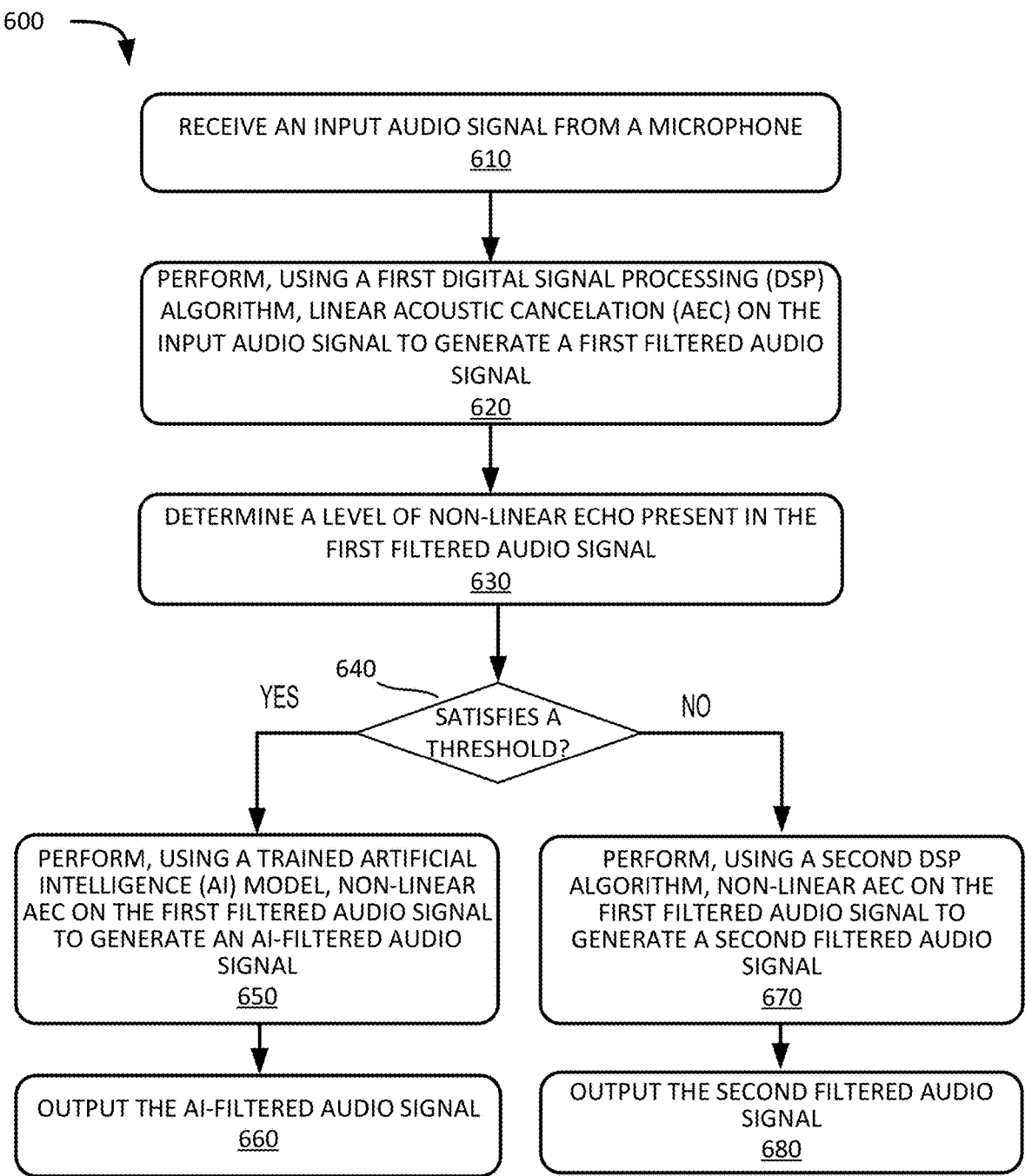

600

RECEIVE AN INPUT AUDIO SIGNAL FROM A MICROPHONE
610

PERFORM, USING A FIRST DIGITAL SIGNAL PROCESSING (DSP) ALGORITHM, LINEAR ACOUSTIC CANCELATION (AEC) ON THE INPUT AUDIO SIGNAL TO GENERATE A FIRST FILTERED AUDIO SIGNAL
620

DETERMINE A LEVEL OF NON-LINEAR ECHO PRESENT IN THE FIRST FILTERED AUDIO SIGNAL
630

640
SATISFIES A THRESHOLD?
YES     NO

PERFORM, USING A TRAINED ARTIFICIAL INTELLIGENCE (AI) MODEL, NON-LINEAR AEC ON THE FIRST FILTERED AUDIO SIGNAL TO GENERATE AN AI-FILTERED AUDIO SIGNAL
650

PERFORM, USING A SECOND DSP ALGORITHM, NON-LINEAR AEC ON THE FIRST FILTERED AUDIO SIGNAL TO GENERATE A SECOND FILTERED AUDIO SIGNAL
670

OUTPUT THE AI-FILTERED AUDIO SIGNAL
660

OUTPUT THE SECOND FILTERED AUDIO SIGNAL
680

FIG. 6

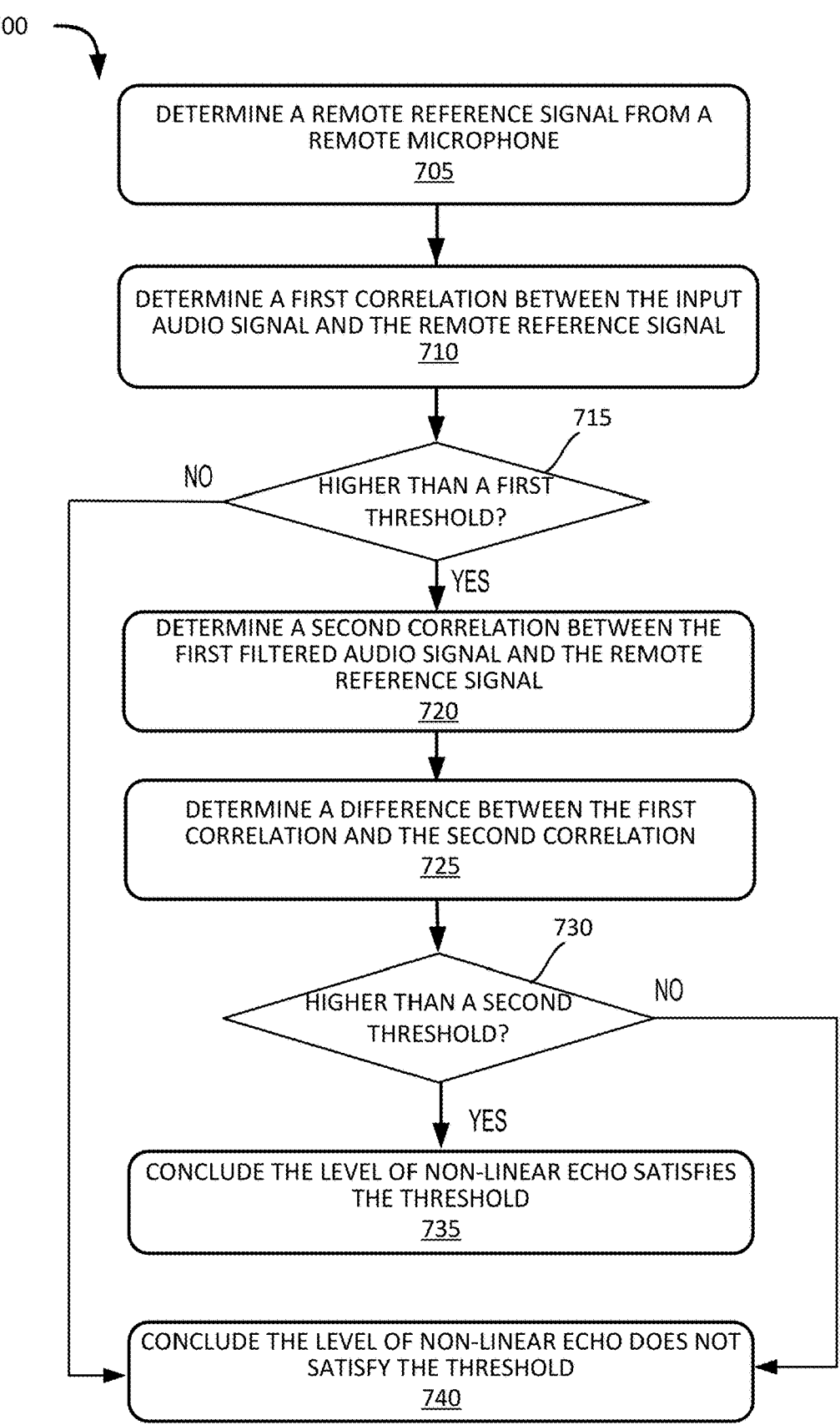

700

DETERMINE A REMOTE REFERENCE SIGNAL FROM A
REMOTE MICROPHONE
705

DETERMINE A FIRST CORRELATION BETWEEN THE INPUT
AUDIO SIGNAL AND THE REMOTE REFERENCE SIGNAL
710

715

HIGHER THAN A FIRST
THRESHOLD?

NO

YES

DETERMINE A SECOND CORRELATION BETWEEN THE
FIRST FILTERED AUDIO SIGNAL AND THE REMOTE
REFERENCE SIGNAL
720

DETERMINE A DIFFERENCE BETWEEN THE FIRST
CORRELATION AND THE SECOND CORRELATION
725

730

HIGHER THAN A SECOND
THRESHOLD?

NO

YES

CONCLUDE THE LEVEL OF NON-LINEAR ECHO SATISFIES
THE THRESHOLD
735

CONCLUDE THE LEVEL OF NON-LINEAR ECHO DOES NOT
SATISFY THE THRESHOLD
740

HYBRID DIGITAL SIGNAL PROCESSING-ARTIFICIAL INTELLIGENCE ACOUSTIC ECHO CANCELLATION FOR VIRTUAL CONFERENCES

FIELD

The present application generally relates to virtual conferencing and more specifically relates to hybrid digital signal processing-artificial intelligence (DSP-AI) acoustic echo cancellation (AEC) for virtual conferences.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 6 shows an example method for performing hybrid DSP-AI AEC for virtual conferences;

FIG. 7 shows an example method for determining whether a level of nonlinear echo satisfies a threshold for using AI-nonlinear AEC;

DETAILED DESCRIPTION

Figure 1:
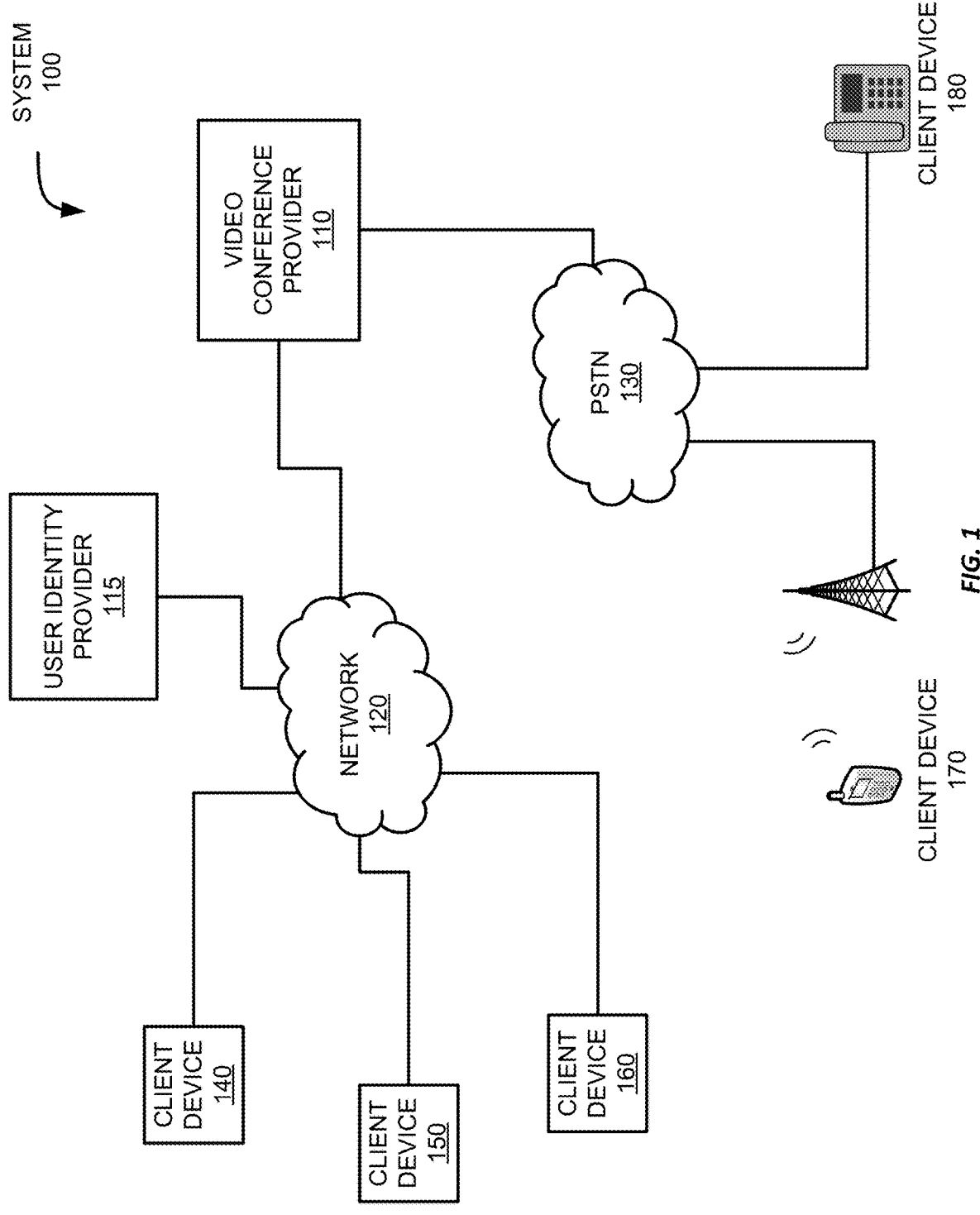
FIG. 1 shows an example system that provides videoconferencing functionality to various client devices.

Examples are described herein in the context of hybrid DSP-AI AEC for virtual conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During a virtual conference, participants may engage with each other to discuss any matters of interest. Typically, such participants will interact in a virtual conference using a camera and microphone, which provide video and audio streams (each a "media" stream; collectively "multimedia"

streams) that can be delivered to the other participants by the virtual conference provider and be displayed via the various client devices' displays or speakers.

Because the participants interact with each other using microphones and audio output devices, like speakers, a common problem can be undesired audio feedback and echoes that are picked up by a participant's microphone and then broadcast back to the other participants in the video conference. For example, if a participant at a local client device has their microphone unmuted and is talking at the same time while a remote participant at a remote client device is talking, the local speaker outputs the remote participant's speech, the echoes of which will be picked up by the local microphone. The local microphone will also pick up speech from the local participant. But it would be undesirable to send an audio stream from the local client device that includes both the local participant's speech and the remote participant's speech that had been output by the local speaker. Thus, the local client device employs acoustic echo cancelation ("AEC") to remove the audio of the remote participant's speech from the audio captured by the local microphone.

A difficulty with AEC, however, is that there are many different types of unwanted sound that may be captured along with the local participant's speech. One type of unwanted sound is referred to as "direct" or "linear" echo, which generally refers to sound waves that propagate directly from an audio output device, e.g., one or more speakers, to an audio input device, e.g., a microphone. Thus, these audio waves have not been reflected within the local participant's environment, such as an office or a living area.

Another type of unwanted sound is referred to as "indirect" or "nonlinear" echo. In contrast to linear echoes, nonlinear echoes result from audio waves reflecting within the local participant's environment. Sound waves that are output by the local client device's speakers may reflect off of one or more surfaces before arriving at the microphone. This causes distortion of those sound waves as well as introduces time delays relative to sound waves that propagate more directly to the microphone. For example, portions of sound waves that travel directly to the microphone from the speakers will arrive before different portions of those same sound waves that reflect off of a wall or other surface. Further, different echoes may arrive at different times. Thus, nonlinear echo can provide additional difficulties when performing AEC.

To provide high-quality AEC in such a virtual conference setting, the participant's client device executes a client software application to participate in virtual conferences. The client software application (or "client software") executes AEC that includes a software component to perform digital signal processing ("DSP") linear AEC on linear echoes, or "DSP linear AEC." After performing linear AEC, the client software then analyzes the output of the linear AEC software component to determine the contribution of nonlinear echo to the remaining audio data. If the nonlinear echo satisfies a threshold, the client software executes an artificial intelligence ("AI")-based nonlinear AEC software component. However, if the contribution of nonlinear echoes does not satisfy the threshold, the client software instead executes a DSP-based nonlinear AEC software component.

AI-based nonlinear AEC techniques are highly computationally complex and thus can impose significant computational burdens on the participant's client device. In addition, AI-based nonlinear AEC techniques tend to be highly specific to particular environments, e.g., they have been trained with audio samples from particular environments. Thus, they tend to provide excellent nonlinear AEC, but at the expense of high computational burden. In contrast, DSP-based nonlinear AEC is significantly less computationally complex, but tends to perform less well in environments with complicated nonlinear echoes. Thus, this example attempts to determine the ideal approach to AEC, depending on the participant's environment, and provide high-quality audio streams, regardless of the participant's environment.

This illustrative example is given to introduce the reader to the general subject matter discussed herein and the disclosure is not limited to this example. The following sections describe various additional non-limiting examples and examples of hybrid DSP-AI AEC for virtual conferences.

Referring now to FIG. 1, FIG. 1 shows an example system 100 that provides videoconferencing functionality to various client devices. The example system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
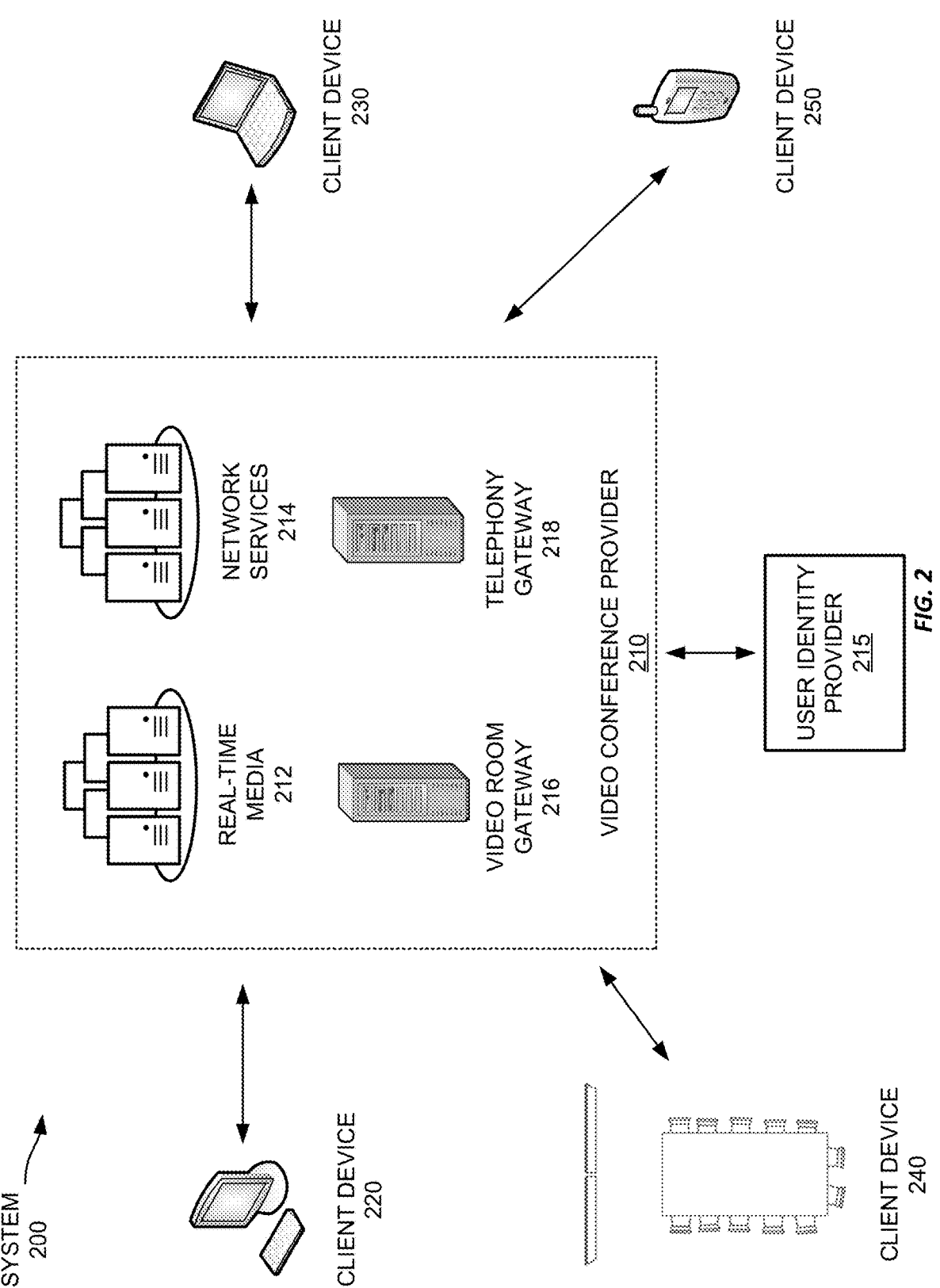
FIG. 2 shows an example system in which a video conference provider provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these client devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateway servers 216, and one or more telephony gateway servers 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O) as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these network services servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 220-250 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these telephony gateway servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
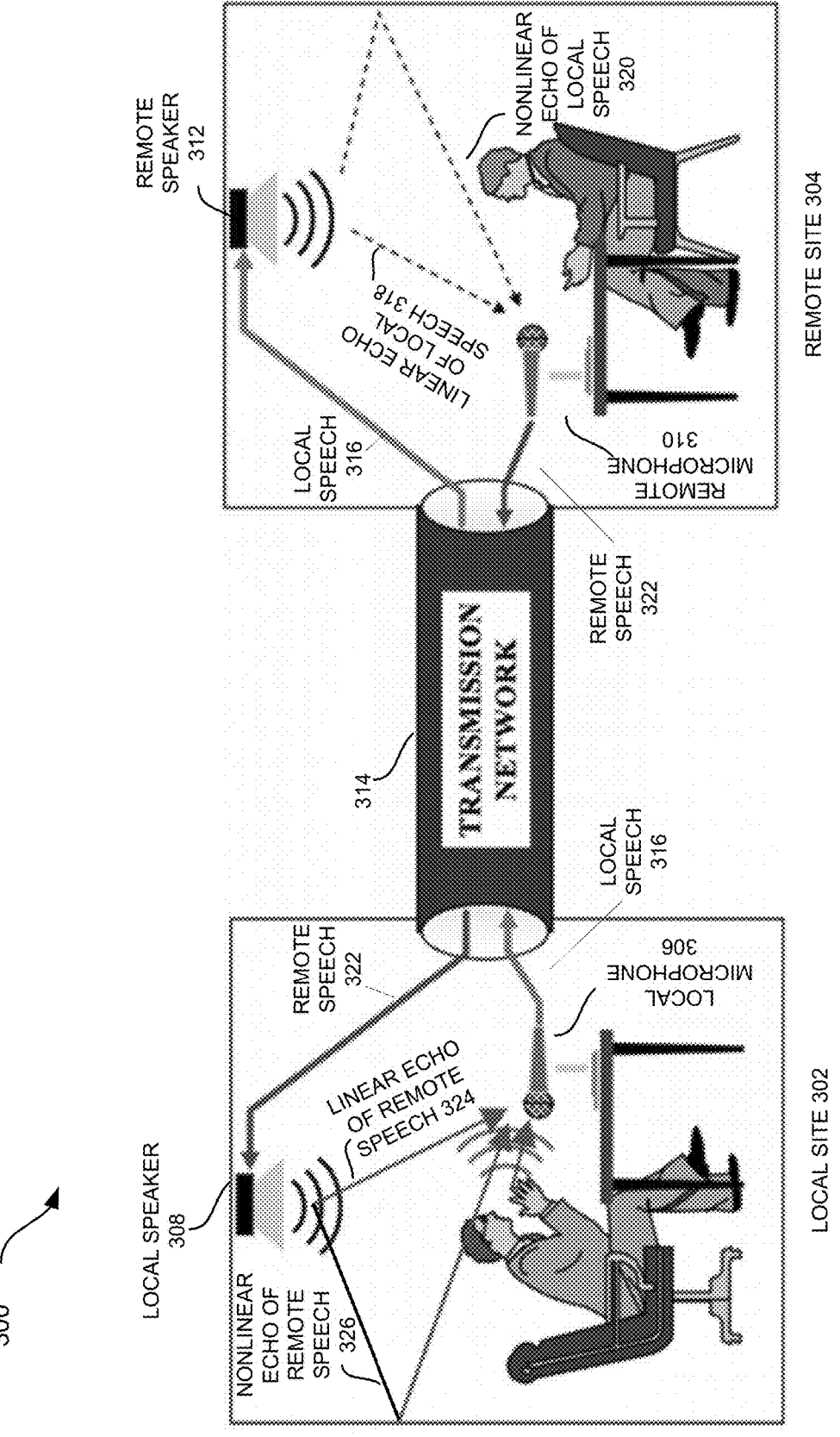
FIG. 3 shows an example system for virtual conferences that illustrates echoes generated at different participant sites.

Referring now to FIG. 3, FIG. 3 shows an example system 300 for virtual conferences that illustrates echoes generated at different participant sites 302, 304. The example system 300 includes a local site 302 and a remote site 304. The local site 302 has a local microphone 306 and a local speaker 308. The remote site 304 has a remote microphone 310 and a remote speaker 312. The local site 302 may cause echoes of audio signals from the local speaker 308. The remote site 304 may cause echoes of audio signals from the remote speaker 312. Three example scenarios are described herein to illustrate how echoes are created and can affect audio quality.

In a near-end single talk scenario, only the local participant speaks. The local speech 316 is transmitted through a transmission network 314 to the remote site 304. The remote speaker 312 plays out the local speech. The remote microphone 310 may pick up some audio signals of the local speech directly from the remote speaker 312. The audio signals directly from the remote speaker 312 to the remote microphone 310 can be called linear echo 318 of the local speech. In addition, some audio signals may be reflected by the environment at the remote site 304, such as walls and ceilings and other objects, before arriving at the remote microphone 310. These reflected audio signals may be called nonlinear echo 320 of the local speech. Both linear echo and nonlinear echo can be transmitted back to the local site if there is no proper AEC at the remote site 304. Then the local participant may hear the echoes of their own speech. The echoes received at the local site 302 may be further reflected and sent back to the remote site 304 if there is no proper AEC at the local site 302. Then the remote participant may hear echoes of the local speech. The echoes damage the quality of the local speech and the virtual conference.

In a far-end single talk scenario, only the remote participant speaks. The remote speech 322 is transmitted through the transmission network 314 to the local site 302. The local speaker 308 plays the remote speech 322. Some audio signals of the remote speech can be picked up by the local microphone 306 directly from the local speaker 308, which is linear echo 324 of the remote speech. Some audio signals of the remote speech may be reflected by the local environment at the local site 302, such as walls, ceilings and other objects, before getting to the local microphone 306. The reflected audio signals are nonlinear echo 326 of the remote speech. The local microphone 306 may pick up both types of echo signals and transmit back to the remote site 304. The remote participant may hear the echoes of their own speech if there is no AEC at the local site 302, just like the local participant in the near-end single talk scenario can hear the echoes of their own speech if there is no AEC at the remote site 304. The echo signals from the local site 302 may be further reflected at the remote site 304 and sent back to the local site 302 if there is no AEC at the remote site 304. Then the local participant may hear the echo of the remote participant's speech.

In a double talk scenario, the local participant and the remote participant speak at the same time. This scenario can be considered as a combination of the near-end single talk scenario and the far-end single talk scenario. The echoes may also add up to distort the quality of the local speech heard by the remote participant and the quality of the remote speech heard by the local participant. For example, the local participant may not only hear the remote speech from the remote participant, but also the echoes of the remote speech and the echoes of the local participant's own local speech. Similarly, the remote participant may not only hear the local speech from the local participant, but also the echoes of the local speech and the echoes of the remote participant's own remote speech.

When the environment is complex with respect to reflection and noise, the echo components in audio signals can get more complicated. That is, besides the linear echo received by a microphone directly from a speaker at one site, there will be multiple nonlinear echo components that are reflected from various surfaces at the site. When multiple participants speak at the same time during a virtual conference and when some of the environments are highly sound-reflective, the audio signal from a microphone can include various distorted nonlinear echo components, which can damage the quality of the audio signal. Thus, it is desirable to have effective ACE for nonlinear echo components in different environments.

AEC is an important part in audio processing in real-time communications applications. DSP-based AEC algorithms have been developed and applied in many real-time communications applications. DSP AEC typically consists of two parts: the DSP-linear part and the DSP-nonlinear part.

The DSP-linear part is used to cancel the linear echo and the DSP-nonlinear part is used to cancel the nonlinear echo.

DSP-based AEC has several advantages. For example, the computation consumption is low, and the performance is stable and predictable, and the overall function of the DSP-based AEC is robust. Generally, the DSP-based AEC is robust enough in most environments (e.g., 95% of the time) that additional gains in AEC from using more computationally complex algorithms are not necessary. However, the DSP-based AEC can easily fail when severe nonlinear distorted echo happens in a double talk scenario, especially when the environment is complex and prone to create echoes. In these situations, DSP-based AEC tends to overly suppress both speech and echo to avoid any residual echo.

Another approach to AEC is to use trained AI models. AI models typically can achieve better performance in scenarios involving severe nonlinear echoes, such as in some double talk scenarios. However, to achieve a satisfying result, a robust AI model can consume much more computation resources, for example, 5 to 10 times the computation resources for DSP-based AEC.

The present disclosure provides a hybrid DSP-AI AEC technique. DSP-nonlinear AEC can perform well in many cases, and AI-nonlinear AEC can be used when particularly severe nonlinear echoes are detected, which is when the DSP-nonlinear AEC does not perform as well. Further, since an AI model is only needed to filter out severe nonlinear echo components, an all-round AI model may not be necessary and only an AI model expertized in a certain environment, or a few select environments, may be sufficient. Thus, some examples of hybrid DSP-AI AEC only need a smaller AI model that is trained with training data from specific environments. This way, an example hybrid DSP-AI AEC can save considerable computational resources as compared to full-time AI-based AEC for nonlinear echo components.

Figure 4:
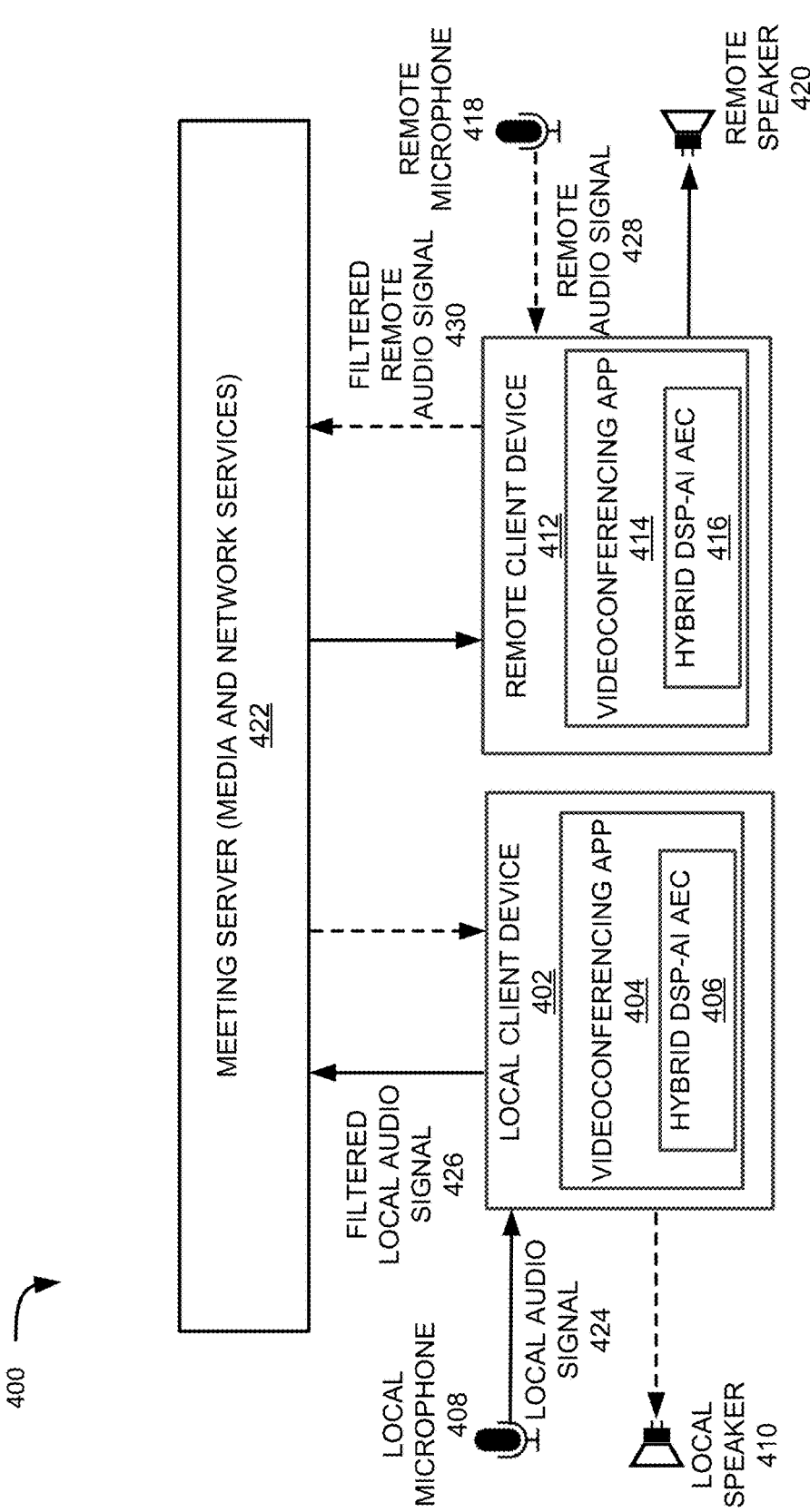
FIG. 4 shows an example system configured with hybrid DSP-AI AEC for virtual conferences.

Referring now to FIG. 4, FIG. 4 shows an example system 400 configured with hybrid DSP-AI AEC for virtual conferences as described herein. The example system 400 includes a local client device 402 and a remote client device 412 coupled to a meeting server 422 provided by a virtual conference provider during a videoconferencing meeting. The meeting server 422 provides media and network services for the local client device 402 and the remote client device 412 during the meeting. The meeting server 422 may also referred to as a multimedia router and can be implemented by the real-time media servers 212 working with the network services servers 214.

The local client device 402 is installed with a videoconferencing application 404. The videoconferencing application 404 includes a hybrid DSP-AI AEC module 406. The local client device 402 includes a local microphone 408 for transmitting the local audio signal 424. The local client device 402 also includes a local speaker 410 for outputting remote audio signal 428 from the remote microphone 418 at the remote client device 412. Similarly, the remote client device 412 is also installed with a videoconferencing application 414, which includes a hybrid DSP-AI AEC module 416. The remote client device 412 includes a remote microphone 418 for transmitting the remote audio signal 428. The remote client device 412 also includes a remote speaker 420 for outputting local audio signal 424 from the local microphone 408 at the local client device 402. The local client device 402 and the remote client device 412 can be a desktop computer, a notebook computer, a tablet, a smart phone, or any other computing devices equipped with audio input and output devices. The local client device 402 and the remote client device 412 can be the same type of computing devices or different types of computing devices.

The local client device 402 and the remote client device 412 maintain an active data connection during a virtual meeting. There can be video data (not shown) and audio data, which is illustrated as filtered local audio signal 424 out of the hybrid DSP-AI AEC module 406 at the local client device 402 and filtered remote audio signal 430 out of the hybrid DSP-AI AEC module 416 at the remote client device 412.

The hybrid DSP-AI AEC module 406 at the local client device 402 filters the local audio signal 424 from the local microphone 408. The local audio signal 424 may include the local speech signal by the local participant at the local client device 402 and various echo components, including echoes of the local speech signal by a local participant at the local client device 402 and echoes of the remote speech signal by a remote participant at the remote client device 412. The hybrid DSP-AI AEC module 406 at the local client device 402 is configured to filter out the echo components from the local audio signal 424 and transmits the filtered local audio signal 426 to the remote client device 412 via the meeting server 422.

Similarly, the hybrid DSP-AI AEC module 416 at the remote client device 412 filters the remote audio signal 428 from the remote microphone 418. The remote audio signal 428 may include the remote speech signal by the remote participant at the remote client device 412 and various echo components, including echoes of the local speech signal by a local participant at the local client device 402 and echoes of the remote speech signal by a remote participant at the remote client device 412. The hybrid DSP-AI AEC module 416 at the remote client device 412 is configured to filter out the echo components from the remote audio signal 428 and transmits the filtered remote audio signal 430 to the local client device 402 via the meeting server 422.

Figure 5:
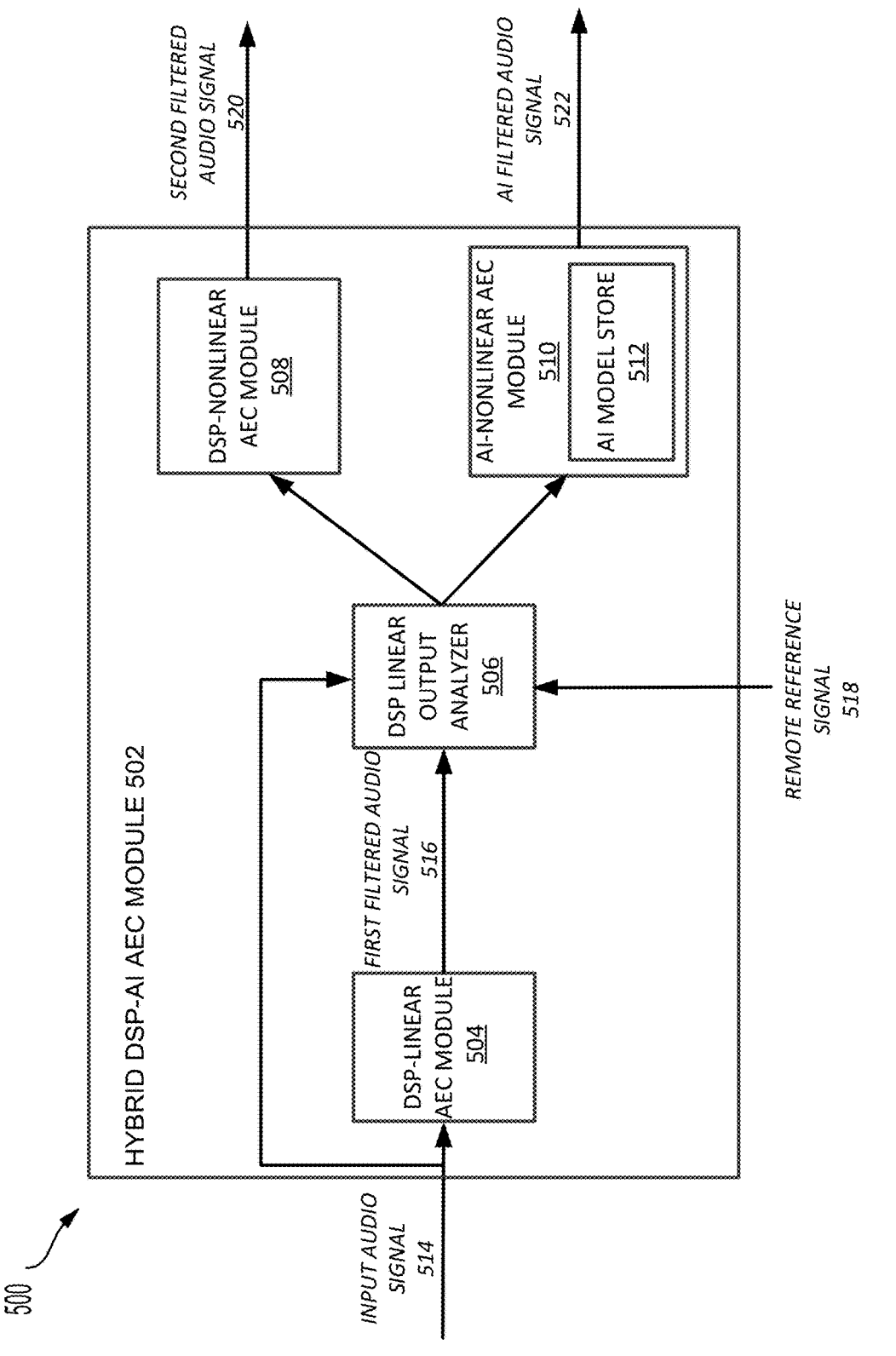
FIG. 5 illustrates a block diagram of an example of a signal processing flow in a hybrid DSP-AI AEC module.

Referring now to FIG. 5, FIG. 5 illustrates a block diagram of an example of a signal processing flow 500 in a hybrid DSP-AI AEC module 502 as described herein. In this example, the hybrid DSP-AI AEC module 502 receives an input audio signal 514. The input audio signal 514 originates from a microphone such as the local microphone 408 or the remote microphone 418. The hybrid DSP-AI AEC module 502 is the hybrid DSP-AI AEC module 406 at the local client device 402 when the input audio signal 514 is the local audio signal 424 from the local microphone 408. The hybrid DSP-AI AEC module 502 is hybrid DSP-AI AEC module 416 at the remote client device 412 when the input audio signal 514 is the remote audio signal 428 from the remote microphone 418. In other words, the hybrid DSP-AI AEC module 502 and input audio signals 514 are located at the same client device in this example. However, it should be appreciated that while the hybrid DSP-AI AEC module 502 can be executed by a client device, such as the local client device 402 or the remote client devices 412 shown in FIG. 4, in some examples the hybrid DSP-AI AEC module 502 may be executed by a remote computing device, such as a server operated by the virtual conference provider. In one such example, the server may receive unfiltered input audio signals from a client device and perform AEC on the received input audio signals as will be discussed below. The filtered audio signal may then be distributed to other participants in a virtual meeting.

The hybrid DSP-AI AEC module 502 includes a DSP-linear AEC module 504 to filter out linear echo components from the input audio signal 514. In some examples, the DSP-linear AEC module 504 comprises a Kalman filter.

Alternatively, the DSP-linear AEC module 504 may comprise a multidelay block frequency domain (MDF) adaptive filter or any other suitable DSP-linear AEC technique. The output of the DSP-linear AEC module 504 is shown as a first filtered audio signal 516. The first filtered audio signal 516 is then analyzed by a DSP linear output analyzer 506.

The input audio signal 514 and a remote reference signal 518 are also used by the DSP linear output analyzer 506 for analyzing the first filtered audio signal 516. First, the DSP linear output analyzer 506 determines if the input audio signal 514 is from an echo-generating environment by determining a first correlation between the input audio signal 514 and the remote reference signal 518. An environment can be considered as echo-generating environment when audio signals from an audio output device (e.g., a speaker) in the environment can be received by an audio input device (e.g., a microphone), the audio signals received by the audio input device directly from the audio output device being linear echoes; or when the environment has audio-reflective surfaces or audio-distorting objects that can reflect audio signals, the reflected audio signals being nonlinear echoes. In some examples, the remote reference signal 518 is an audio signal from a remote microphone. A first correlation coefficient can be calculated, for example using the Pearson correlation formula, to measure both the strength and direction of a linear relationship between the input audio signal 514 and the remote reference signal 518. In this example, the first correlation coefficient can be a value between −1 and 1, though any suitable range may be employed. It is then compared to a first threshold value. The first threshold value can be a value between 0 and 1 in this example, though any suitable threshold may be used. If the first correlation coefficient is higher than the first threshold value, it means that the input audio signal 514 includes echo of the remote reference signal 518 and the input audio signal 514 is from an echo-generating environment. Second, the DSP linear output analyzer 506 determines if nonlinear echo residual is still high in the first filtered audio signal 516. The DSP linear output analyzer 506 determines a second correlation between the first filtered audio signal 516 and the remote reference signal 518 by calculating a second correlation coefficient, for example by using the Pearson correlation formula. The second correlation coefficient can indicate the strength and direction of a linear relationship between the first filtered audio signal 516 and the remote reference signal 518.

In some examples, the DSP linear output analyzer 506 determines a difference between the first correlation coefficient and the second correlation coefficient and compares the difference with a second threshold value. The second threshold value can be a value between 0 and 1 in this example, though any suitable threshold value. If the first correlation coefficient is higher than the first threshold value and the difference between the first correlation coefficient and the second correlation coefficient is lower than the second threshold value, the DSP linear output analyzer 506 concludes that the nonlinear echo residual is high in the first filtered audio signal 516 and the AI-nonlinear AEC module 510 is used to process the first filtered audio signal 516. If either the first correlation coefficient is not higher than the first threshold value or the difference between the first correlation coefficient and the second correlation coefficient is not higher than the second threshold value, the DSP linear output analyzer 506 concludes that the nonlinear echo residual is not high in the first filtered audio signal 516 and the DSP-nonlinear AEC module 508 is used to process the first filtered audio signal 516.

In some examples, the DSP linear output analyzer 506 compares the second correlation coefficient with a third threshold value directly. The third threshold value can be a value between 0 and 1 in this example, though any suitable threshold value. If the first correlation coefficient is higher than the first threshold value and the second correlation coefficient is higher than the third threshold value, the DSP linear output analyzer 506 concludes that the nonlinear echo residual is high in the first filtered audio signal 516 and the AI-nonlinear AEC module 510 is used to process the first filtered audio signal 516. If either the first correlation coefficient is not higher than the first threshold value or the second correlation coefficient is not higher than the third threshold value, the DSP linear output analyzer 506 concludes that the nonlinear echo residual is not high in the first filtered audio signal 516 and the DSP-nonlinear AEC module 508 is used to process the first filtered audio signal 516.

The DSP-nonlinear AEC module 508 comprises a Wiener filter for filtering out nonlinear echo residuals in the first filtered audio signal 516 when the environment from where the input audio signal 514 is originated is not an echo-generating environment or when the nonlinear echo residual in the first filtered audio signal 516 is not high.

The AI-nonlinear AEC module 510 comprises one or more trained AI models for filtering out nonlinear echo residuals in the first filtered audio signal. The one or more trained AI models are stored in an AI model store 512. The one or more trained AI models can be trained with training data from different echo-generating environments. The different echo-generating environments can be an office, an auditorium, a classroom, a theater, an open space, or any other environments with complex audio-reflective surfaces or audio-distorting objects. The AI-nonlinear AEC module 510 can select a trained AI model based on the analysis of the first filtered audio signal 516 from the DSP linear output analyzer 506. In some examples, the one or more trained AI models are based on the same AI model. In some examples, the one or more trained AI models are based on different AI models. Suitable AI models include convolutional neural network (CNN) models, long short-term memory (LSTM) models, or any other suitable AI model. For example, a U-Net, which is a type of CNN model, can be trained with different sets of training data from different environments to create the one or more trained AI models.

Referring now to FIG. 6, FIG. 6 shows an example method for performing hybrid DSP-AI AEC for virtual conferences. At block 610, a hybrid DSP-AI AEC module 502 receives an input audio signal 514 from a microphone. When the hybrid DSP-AI AEC module 502 is the hybrid DSP-AI AEC module 406 at the local client device 402, the input audio signal 514 is the local audio signal 424 from the local microphone 408. When the hybrid DSP-AI AEC module 502 is the hybrid DSP-AI AEC module 416 at the remote client device 412, the input audio signal 514 is the remote audio signal 428 from the remote microphone 418. It should be appreciated that, as discussed above with respect to FIG. 5, in some examples the hybrid DSP-AI AEC module 502 may be executed at a remote computing device, such as a server operated by the virtual conference provider. The server may receive audio signals from multiple different client devices and use instances of the hybrid DSP-AI AEC module to receive such incoming audio signals.

At block 620, the hybrid DSP-AI AEC module 502 performs, using a first DSP algorithm, linear AEC on the input audio signal 514 to generate a first filtered audio signal 516. In some examples, the DSP-linear AEC module 504 in the hybrid DSP-AI AEC module 502 is configured with a Kalman filter to filter out the linear echo component in the input audio signal 514. In some examples, the DSP-linear AEC module 504 is configured with an MDF adaptive filter to filter out the linear echo component in the input audio signal 514.

Figure 8:
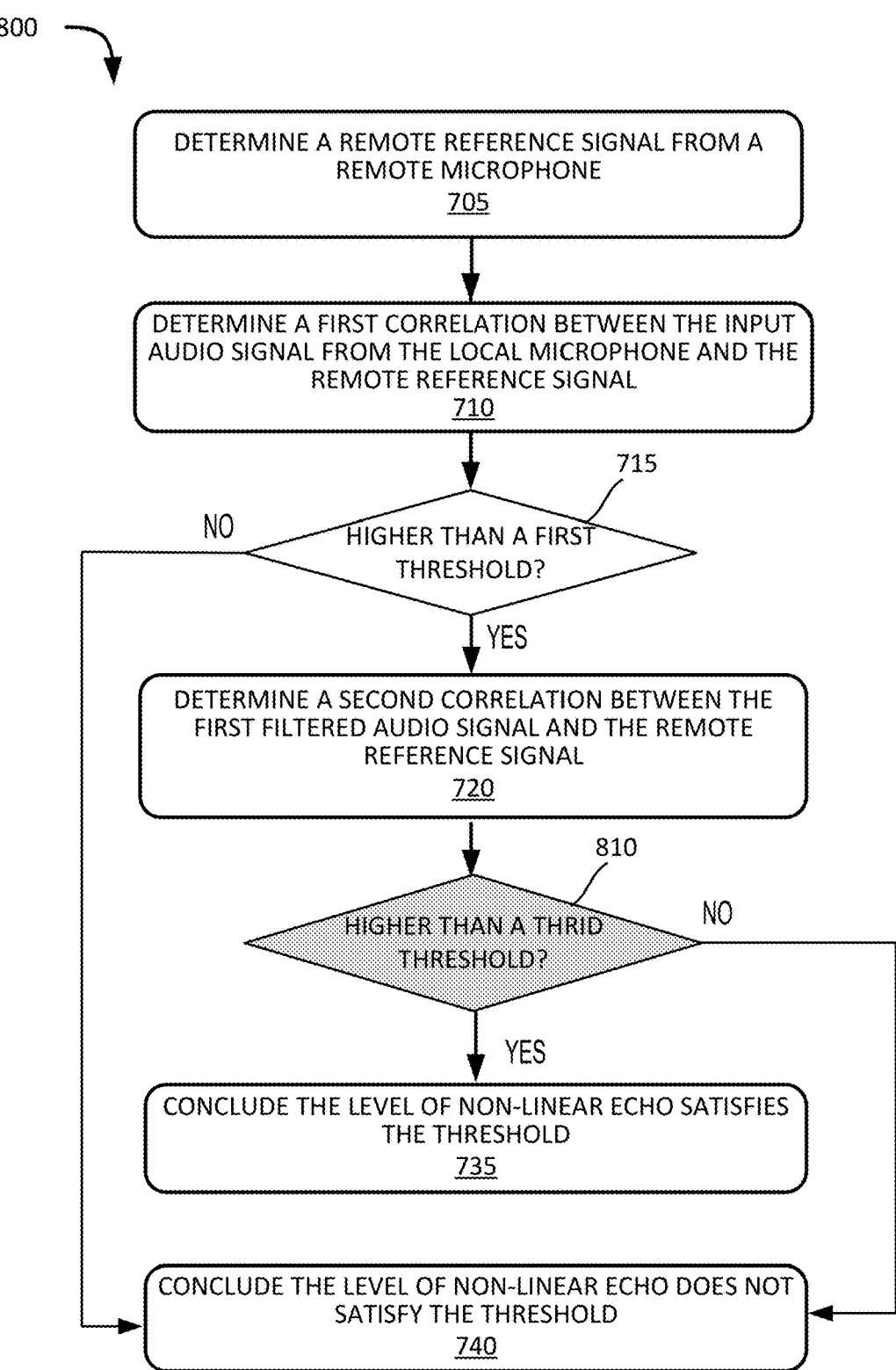
FIG. 8 shows another example method for determining whether a level of nonlinear echo satisfies a threshold for using AI-nonlinear AEC.

At block 630, the hybrid DSP-AI AEC module 502 determines a level of nonlinear echo present in the first filtered audio signal 516 as discussed above with respect to FIG. 5. At block 640, the hybrid DSP-AI AEC module 502 determines if the level of nonlinear echo satisfies a threshold. The DSP linear output analyzer 506 in the hybrid DSP-AI AEC module 502 can first determine if the input audio signal is from an echo-generating environment based on a first correlation between the input audio signal 514 and a remote reference signal 518. The DSP linear output analyzer 506 can then determine a level of the nonlinear echo present in the first filtered audio signal 516 based on a second correlation between the first filtered audio signal 516 and the remote reference signal 518. The first correlation and the second correlation can be used for determining if the level of nonlinear echo present in the first filtered audio signal 516 satisfies the threshold for using AI-nonlinear AEC. FIG. 7 and FIG. 8 illustrate alternative embodiments for determining whether a level of nonlinear echo satisfies a threshold for using AI-nonlinear AEC.

If the level of the nonlinear echo satisfies the threshold, the method 600 proceeds to block 650. At block 650, the hybrid DSP-AI AEC module 502 performs, using a trained AI model, nonlinear AEC on the first filtered audio signal 516 to generate an AI-filtered audio signal 522. The AI-nonlinear AEC module 510 can determine a type of echo-generating environment where the microphone is located by analyzing the nonlinear echo present in the first filtered audio signal 516 and select a trained AI model from multiple available AI models in the AI model store 512 based on the type of echo-generating environment. The multiple available AI models are trained with nonlinear echo data collected from multiple types of echo-generating environments correspondingly. The selected trained AI model and the multiple available AI models can be based on a U-Net CNN model.

At block 660, the hybrid DSP-AI AEC module 502 outputs the AI-filtered audio signal 522. The AI-filtered audio signal 522 is then transmitted to a recipient speaker via the meeting server 422.

If the level of the nonlinear echo does not satisfy the threshold, the method 600 proceeds to block 670. At block 670, the hybrid DSP-AI AEC module 502 performs, using a second DSP algorithm, nonlinear AEC on the first filtered audio signal 516 to generate a second filtered audio signal 520. The DSP-nonlinear AEC module 508 in the hybrid DSP-AI AEC module 502 can filter out the nonlinear echo residual in the first filtered audio signal 516, such as by using a Wiener filter. At block 680, the hybrid DSP-AI AEC module 502 outputs the second filtered audio signal 520. The second filtered audio signal 520 is then transmitted to a recipient speaker via the meeting server 422.

Referring now to FIG. 7, FIG. 7 shows an example method 700 for determining whether a level of nonlinear echo satisfies a threshold for using AI-nonlinear AEC as described herein, which may be used in various methods according to this example, such as with the method 600 discussed above with respect to FIG. 6, to determine whether to use DSP-based or AI-based nonlinear AEC. At block 705, the hybrid DSP-AI AEC module 502 determines a remote reference signal 518 from a remote microphone. In a two-participant example, the remote reference signal is an audio signal from the remote microphone. In some examples when multiple participants are speaking around the same time in the virtual conference, the hybrid DSP-AI AEC module 502 determines more than one reference signal from more than one remote microphone. Then hybrid DSP-AI AEC module 502 can determine whether to obtain a reference signal from a remote microphone by detecting if the remote microphone is active during a predetermined period. For example, the predetermined period can be several seconds.

At block 710, the DSP linear output analyzer 506 in the hybrid DSP-AI AEC module 502 determines a first correlation coefficient between the input audio signal and the remote reference signal. The first correlation coefficient, which is a value between –1 and 1 in this example, is calculated to measure both the strength and direction of a linear relationship between the input audio signal 514 and the remote reference signal 518.

At block 715, the DSP linear output analyzer 506 determines if the first correlation coefficient is higher than a first threshold. The DSP linear output analyzer 506 compares the first correlation coefficient to the first threshold. The first threshold can be preset at a value between 0 and 1 in this example. If the first correlation coefficient is higher than the first threshold, it indicates that the input audio signal 514 has echo components that are associated with the remote reference signal 518. If the first correlation coefficient is not higher than the first threshold, it indicates that the echo components in the input audio signal 514 is not salient.

If the first correlation coefficient is not higher than the first threshold value, the method 700 proceeds to block 740. At block 740, the DSP linear output analyzer 506 of the hybrid DSP-AI AEC module 502 concludes that the level of non-linear echo does not satisfy the threshold for using AI-nonlinear AEC.

If the first correlation coefficient is higher than the first threshold, the method 700 proceeds to block 720. At block 720, the DSP linear output analyzer 506 determines a second correlation coefficient between the first filtered audio signal 516 and the remote reference signal 518. The DSP linear output analyzer 506 calculates the second correlation coefficient, which is a value between –1 and 1 in this example, to measure both the strength and direction of a linear relationship between the first filtered audio signal 516 and the remote reference signal 518.

At block 725, the DSP linear output analyzer 506 determines a difference between the first correlation coefficient and the second correlation coefficient. If the difference is not higher than a second threshold, the method 700 proceeds to block 740, concluding that the level of nonlinear echo does not satisfy the threshold for using AI-nonlinear AEC. If the difference is higher than the second threshold, the method 700 proceeds to block 735, concluding the level of nonlinear echo satisfies the threshold for using AI-nonlinear AEC. The output of this example method 700 may be used by examples according to this disclosure, such as the example method 600 discussed above with respect to FIG. 6, to determine whether the level of nonlinear echo present in the first filtered audio signal satisfies a threshold at block 640.

Referring now to FIG. 8, FIG. 8 shows another example method 800 for determining whether a level of nonlinear echo satisfies a threshold for using AI-nonlinear AEC as described herein, which may be used in various methods according to this example, such as with the method 600 discussed above with respect to FIG. 6, to determine whether to use DSP-based or AI-based nonlinear AEC. The example method 800 is similar to the example method 700 illustrated in FIG. 7. However, after determining a second correlation coefficient between the first filtered audio signal and the remote reference signal at block 720, instead of determining a difference between the first correlation coefficient and the second correlation coefficient at block 725 and determining if the difference is higher than a second threshold at block 730 in method 700, the DSP linear output analyzer 506 determines if the second correlation coefficient is higher than a third threshold at block 810. Thus, if the first correlation coefficient is higher than the first threshold at block 715 and the second correlation coefficient is higher than the third threshold at block 810 in method 800, the DSP linear output analyzer 506 can conclude that the level of nonlinear echo satisfies the threshold for using AI-nonlinear AEC. If the first correlation coefficient is not higher than the first threshold at 715 or the second correlation coefficient is not higher than the third threshold at 810, the hybrid DSP-AI AEC module 502 can conclude that the level of nonlinear echo does not satisfy the threshold for using AI-nonlinear AEC. As with the example discussed above with respect to FIG. 7, the output of this example method 800 may be used by examples according to this disclosure, such as the example method 600 discussed above with respect to FIG. 6, to determine whether the level of nonlinear echo present in the first filtered audio signal satisfies a threshold at block 640.

Figure 9:
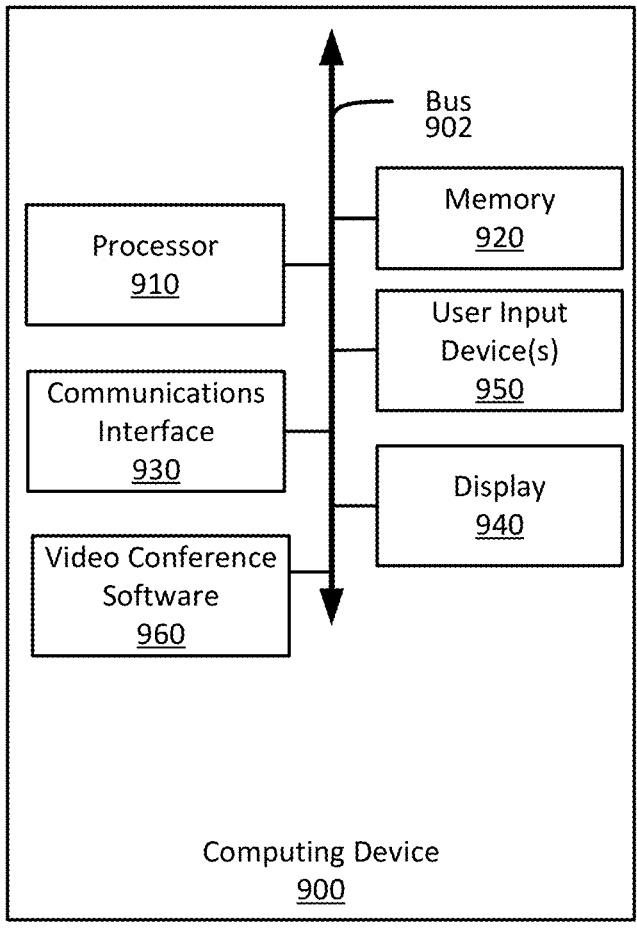
FIG. 9 shows an example computing device suitable for use with example systems and methods for hybrid DSP-AI AEC for virtual conferences.

Referring now to FIG. 9, FIG. 9 shows an example computing device 900 suitable for use in example systems or methods for hybrid DSP-AI AEC for virtual conferences according to this disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more methods for hybrid DSP-AI AEC for virtual conferences according to different examples, such as part or all of the example methods 600, 700, and 800 described above with respect to FIGS. 6-8. The computing device 900, in this example, also includes one or more user input devices 950, such as a keyboard, mouse, touchscreen, microphone, etc., to accept user input. The computing device 900 also includes a display 940 to provide visual output to a user.

In addition, the computing device 900 includes a virtual conferencing application 960 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
receiving an input audio signal from a microphone;
performing, using a first digital signal processing (DSP) algorithm, linear acoustic echo cancelation (AEC) on the input audio signal to filter out linear echo presented in the input audio signal and generate a first filtered audio signal;
determining a level of nonlinear echo present in the first filtered audio signal;
responsive to determining that the level of nonlinear echo does not satisfy a threshold:
performing, using a second DSP algorithm, nonlinear AEC on the first filtered audio signal to generate a second filtered audio signal; and
outputting the second filtered audio signal.

2. The method of claim 1, further comprising:
responsive to determining that the level of nonlinear echo satisfies the threshold, determining a type of environment where the microphone is located by analyzing the nonlinear echo present in the first filtered audio signal; and
selecting a trained AI model for canceling the nonlinear echo, from multiple available AI models, based on the type of environment where the microphone is located.

3. The method of claim 2, wherein the multiple available AI models are trained with nonlinear echo data collected from multiple types of environment correspondingly.

4. The method of claim 2, wherein the trained AI model is U-Net convolutional neural network.

5. The method of claim 1, wherein the first DSP algorithm comprises a Kalman filter or a multidelay block frequency domain adaptive filter.

6. The method of claim 1, wherein the second DSP algorithm comprises a Wiener filter.

7. The method of claim 1, further comprising:
determining a reference signal from a remote microphone;
determining a first correlation coefficient between the input audio signal from the microphone and the reference signal;
comparing the first correlation coefficient to a first threshold value; and
determining a second correlation coefficient between the first filtered audio signal and the reference signal.

8. The method of claim 7, further comprising:
determining that the level of nonlinear echo satisfies the threshold when the first correlation coefficient is higher than the first threshold value and a difference between the first correlation coefficient and the second correlation coefficient is lower than a second threshold value.

9. The method of claim 7, further comprising:
determining that the level of nonlinear echo satisfies the threshold when the first correlation coefficient is higher than the first threshold value and the second correlation coefficient is higher than a third threshold value.

10. A system comprising:
a communications interface;
a non-transitory computer-readable medium; and
one or more processors communicatively coupled to the communications interface and the non-transitory computer-readable medium, the one or more processors configured to execute processor-executable instructions stored in the non-transitory computer-readable medium to:
receive an input audio signal from a microphone;
perform, using a first digital signal processing (DSP) algorithm, linear acoustic echo cancelation (AEC) on the input audio signal to filter out linear echo presented in the input audio signal and generate a first filtered audio signal;

determine a level of nonlinear echo present in the first filtered audio signal;

responsive to determining that the level of nonlinear echo satisfies a threshold:

perform, using a second DSP algorithm, nonlinear AEC on the first filtered audio signal to generate a second filtered audio signal; and output the second filtered audio signal.

11. The method of claim 1, further comprising:

responsive to determining that the level of nonlinear echo satisfies the threshold, inputting, to a trained artificial intelligence (AI) model, the first filtered audio signal;

receiving, from the trained AI model, an AI-filtered audio signal; and outputting the AI-filtered audio signal.

12. The system of claim 10, wherein the one or more processors are configured to execute further processor-executable instructions stored in the non-transitory computer-readable medium to:

responsive to determining that the level of nonlinear echo satisfies the threshold, determine a type of environment where the microphone is located by analyzing the nonlinear echo present in the first filtered audio signal; and selecting a trained AI model for canceling the nonlinear echo, from multiple available AI models, based on the type of environment where the microphone is located.

13. The system of claim 12, wherein the multiple available AI models are trained with nonlinear echo data collected from multiple types of environment correspondingly, and wherein the trained AI model is U-Net convolutional neural network.

14. The system of claim 10, wherein the one or more processors are configured to execute further processor-executable instructions stored in the non-transitory computer-readable medium to:

determine a reference signal from a remote microphone;

determine a first correlation coefficient between the input audio signal from the microphone and the reference signal;

compare the first correlation coefficient to a first threshold value; and determine a second correlation coefficient between the first filtered audio signal and the reference signal.

15. The system of claim 14, wherein the one or more processors are configured to execute further processor-executable instructions stored in the non-transitory computer-readable medium to:

determine that the level of nonlinear echo satisfies the threshold when the first correlation coefficient is higher than the first threshold value and a difference between the first correlation coefficient and the second correlation coefficient is lower than a second threshold value.

16. The system of claim 14, wherein the one or more processors are configured to execute further processor-executable instructions stored in the non-transitory computer-readable medium to:

determine that the level of nonlinear echo satisfies the threshold when the first correlation coefficient is higher than the first threshold value and the second correlation coefficient is higher than a third threshold value.

17. The system of claim 10, wherein the one or more processors are configured to execute further processor-executable instructions stored in the non-transitory computer-readable medium to:

responsive to determining that the level of nonlinear echo satisfies a threshold:

input, to a trained artificial intelligence (AI) model, the first filtered audio signal;

receive, from the trained AI model, an AI-filtered audio signal; and output the second filtered audio signal.

18. A non-transitory computer-readable medium comprising processor-executable instructions configured to cause one or more processors to:

receive an input audio signal from a microphone;

perform, using a first digital signal processing (DSP) algorithm, linear acoustic echo cancelation (AEC) on the input audio signal to filter out linear echo presented in the input audio signal and generate a first filtered audio signal;

determine a level of nonlinear echo present in the first filtered audio signal;

responsive to determining that the level of nonlinear echo satisfies a threshold:

perform, using a second DSP algorithm, nonlinear AEC on the first filtered audio signal to generate a second filtered audio signal; and output the second filtered audio signal.

19. The non-transitory computer-readable medium of claim 18, further comprising processor-executable instructions configured to cause one or more processors to:

responsive to determining that the level of nonlinear echo satisfies the threshold, determine a type of environment where the microphone is located by analyzing the nonlinear echo present in the first filtered audio signal; and selecting a trained AI model for canceling the nonlinear echo, from multiple available AI models, based on the type of environment where the microphone is located, wherein the multiple available AI models are trained with nonlinear echo data collected from multiple types of environment correspondingly, and wherein the trained AI model is U-Net convolutional neural network.

20. The non-transitory computer-readable medium of claim 18, further comprising processor-executable instructions configured to cause one or more processors to:

responsive to determining that the level of nonlinear echo does not satisfy the threshold, input, to a trained artificial intelligence (AI) model, the first filtered audio signal;

receiving, from the trained AI model, an AI-filtered audio signal; and output the second filtered audio signal.

* * * * *